Oct. 20, 1970 D. S. MACY 3,534,640

TOOL COUPLING DEVICE

Filed May 16, 1968

INVENTOR
DAVID S. MACY

BY Christel & Bean
ATTORNEYS

United States Patent Office 3,534,640

Patented Oct. 20, 1970

1

3,534,640

TOOL COUPLING DEVICE

David S. Macy, Creve Couer, Mo., assignor to General-Electro Mechanical Corp., Buffalo, N.Y.

Filed May 16, 1968, Ser. No. 729,759
Int. Cl. B23b *51/12*
U.S. Cl. 77—71 4 Claims

ABSTRACT OF THE DISCLOSURE

The tapered shank of a tool such as a drill bit is provided with a helical groove and a flat intersecting one end of the groove. A driving member is provided with a tapered recess for receiving the tool shank and a pin intersecting the recess at an angle corresponding to the helix angle of the groove receives the tapered shank with the pin making line contact with a wall of the helical groove to effect a drive and depth indexing coupling.

SUMMARY OF THE INVENTION

This invention relates to a coupling assembly for a drill member and a drive member therefor, the drive member being adapted for axial displacement through a predetermined stroke in effecting drilling operations, the coupling being arranged to impart rotational drive to the drill member and also to axially locate the drill member with respect to the drive member so that the depth of penetration of the drill member with respect to a work piece, as the drive member is displaced axially, is accurately controlled.

More particularly, the assembly is useful in conjunction with a compound tool such as a combined drill and countersink wherein it is desired accurately to index the tool in an axial direction so that the countersink portion is accurately located to produce accurately dimensioned countersink formations and wherein it is also desirable to relieve the tapered connection of the possibility of galling or the like.

DESCRIPTION OF THE PREFERRED EMBODIMENT

Figures 1, 2, 3, 4, 5, 6:
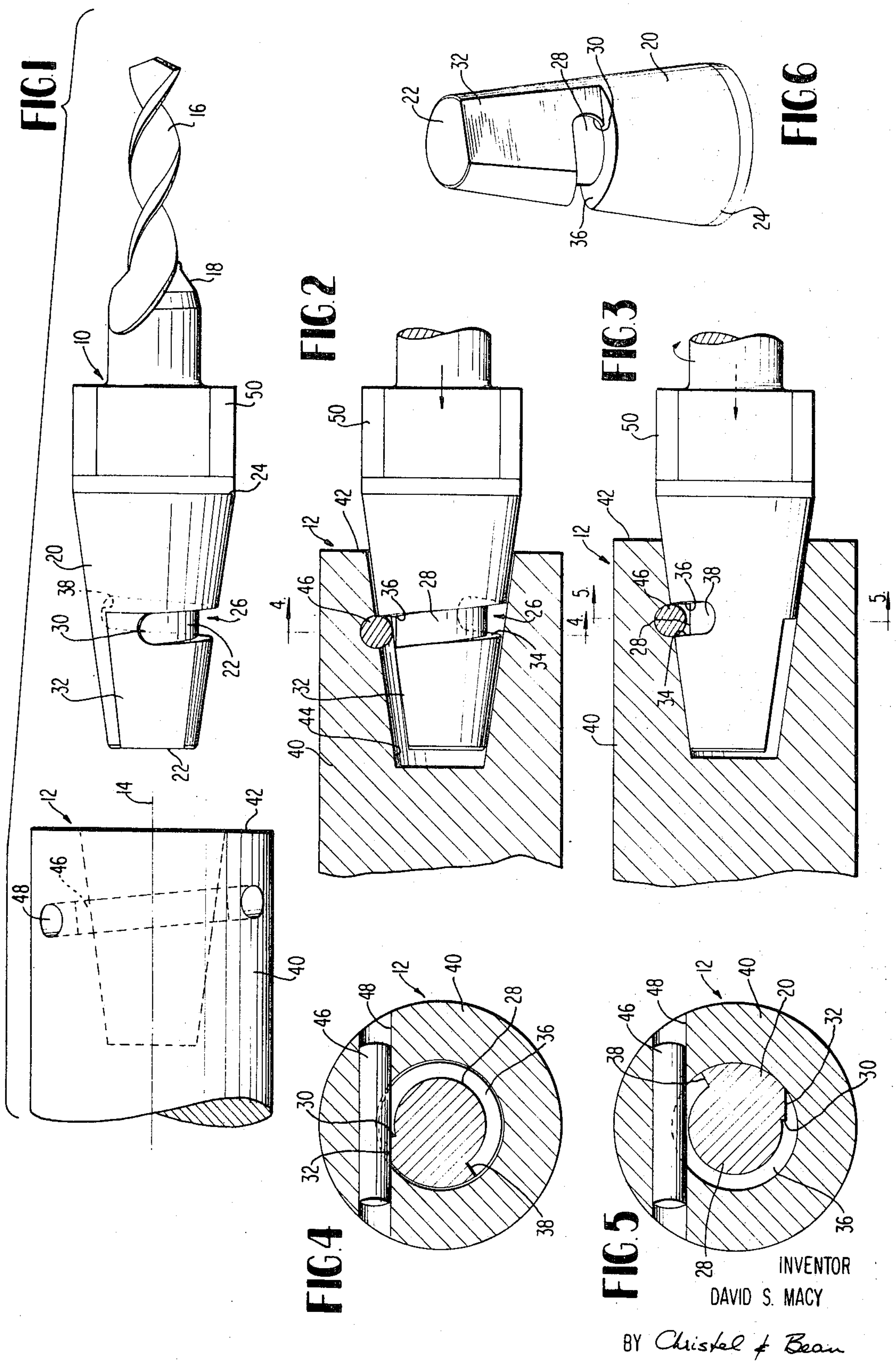
FIG. 1 is a disassembled elevational view of one form of a driving member and associated drilling and countersinking tool constructed according to the present invention.
FIG. 2 is a view, partly in cross section, showing the drill as it is first inserted into the drive member.
FIG. 3 is a view similar to FIG. 2, but showing the drill after rotation thereof to complete and effect the coupling thereof with the drive member.
FIGS. 4 and 5 are cross sectional views on the lines 4—4 and 5—5, respectively, in FIGS. 2 and 3, illustrating the relationships of the drive and indexing pin with respect to the cam groove.
FIG. 6 is a perspective view of the tool shank.

Referring now more particularly to FIG. 1, a compound drilling and countersinking tool is indicated generally by the reference character 10 therein and the driving member for the tool is indicated generally by the reference character 12, the assembly being adapted for rotation about the axis 14 for sequentially performing a drilling and countersinking operation on an associated work piece, not shown. The drilling operation is performed by the drill portion 16 of the tool whereas the countersinking operation is performed by the countersink portion 18 of the tool, as will be obvious to those skilled in the art.

2

In such an arrangement, particularly in production work wherein the drive member is moved through the predetermined axial stroke for each cycle, it is important that the countersinking portion 18 of the tool be accurately located with respect to the work piece and it may in some cases additionally be important that the depth of the hole drilled be maintained within certain tolerances. In either or both events, the working portions of the tool should be accurately located at the bottom of the stroke and this requires that the coupling between the tool 10 and the drive member 12 establish a predetermined axial relationship between these two members which does not require alteration or adjustment of the stroke or stroke position in the event that a new tool is inserted into the driving member 12.

For this purpose, although it will readily be understood that the relationship may be reversed, the tool is provided with a tapered shank 20 so as to present a male portion having a small end 22 and a large end 24 and which male portion is provided intermediate these ends with a helical cam groove indicated generally by the reference character 26. The cam groove is formed with a bottom wall 28 which lies at a fixed distance from the axis 14 of the tool and which extends from a point of origin as indicated by the reference character 30 circumferentially around the shank 20 from the region 30 spaced from the small end 22 to extend toward the larger end 24 at a predetermined helix angle. The shank is also provided with a flat surface 32 extending from the small end 22 to intersect with the region of origin 30 of the cam groove 26, as may be seen more clearly in FIGS. 1, 2, and 6 and, by this arrangement, the cam groove 26 presents a pair of spaced opposed side walls 34 and 36 which extend around the shank 20 at the above mentioned helix angle, the groove terminating in the region 38 as is indicated in FIGS. 1, 3, 4 and 5.

The drive member 12 comprises a body 40 having an end face 42 provided with an inwardly directed tapering recess 44 disposed coaxially with the axis of rotation 14 of the tool assembly and which is adapted snugly to receive the tapered tool shank 20 so that when these two portions are mated as shown in FIG. 3, the tool, and more specifically the countersink portion 18 thereof, is at a predetermined axial distance beyond the end face 42 for purposes described hereinabove.

A cylindrical pin 46 is received within a transverse bore 48 (see particularly FIGS. 4 and 5), which bore lies in a plane parallel with the axis of rotation 14 but is inclined within such plane at the helix angle of the cam groove 26, as will be clear from FIG. 1. The axial location of the pin 46 within the recess 44 is such that when the tool 10 is entered into the recess 44 with the flat surface 32 oriented to clear the pin 46 (FIG. 2), and the tool is thereafter rotated to engage the pin 46 within a portion of the cam groove 26 remote from the region of origin 30 of the cam groove (FIG. 3), the pin will engage in line contact with the wall 36 of the cam groove, engaging the tapered parts 20 and 44 so that the tool is properly oriented as specified hereinabove. That is to say, the tool shank 20 simultaneously snugly engages the tapered bore 44 and contacts its wall portion 36 with the pin 46, thus relieving the taper engagement of any necessity for imparting drive to the tool 10, the drive instead being effected through the medium of the pin 46 having substantial axial extend thereof providing line contact with the cam groove wall 36.

Preferably, the pin 46 is placed ultimately to be received within a portion of the cam groove 26 which has sufficient depth to exceed the radius of the pin 46, it being noted that the constant radius of the bottom wall 28 of the cam groove causes the cam groove to increase in depth in the direction toward the large end 24 of the shank 20.

It will also be noted that the mating of the tapered surfaces of the tool and drive member establishes the axial location of the tool beyond the end face 42 of the drive member, with the pin 46 acting as a stop at this relative position of the parts which fixes this depth indexing relation between the parts and relieves the taper engagement of the necessity for imparting drive between the members.

It will be appreciated also that the groove and pin interconnection acts positively to effect camming of the tool and drive member into and out of mating relation. Conveniently, the tool may be provided with a hexagonal portion 50 with which a suitable wrench may be engaged for these purposes.

In any event, the pin bore 48 and cam groove 26 are machined accurately so that the pin 46 both holds the tool in accurately located relation and also effect drive between the members as is illustrated in FIG. 3.

Obviously, many modifications and variations of the present invention will occur to those skilled in this art in the light of the teachings of the foregoing disclosure. It is thereofore to be understood that, within the scope of the appended claims, the invention may be practiced otherwise than as specifically described above.

I claim:

1. A coupling for imparting rotary drive between a driving member and a coaxial tool member and for establishing a predetermined projection of the tool member axially beyond the driving member,
- one of said members comprising a body having an end face provided with a tapered bore extending axially inwardly therefrom,
- the other member having a tapered male portion snugly received in said tapered bore so that the interfitting of the male portion in the bore establishes said predetermined projecion of the tool member axially beyond the driving member,
- said other member also having a cam groove in said male portion thereof, said cam groove originating at a region spaced from the small end of the tapered male portion and extending from such region in circumferential direction at a predetermined helix angle toward the large end of the tapered male portion, said cam groove presenting a bottom wall and spaced, opposed side walls, and said male portion having a flat surface portion extending from said small end of the male portion to intersect said bottom wall of the cam groove at said region of cam groove origin.
- and a pin carried by said one member, said pin intersecting said tapered bore and being inclined at said predetermined helix angle to engage one of said side walls of the groove along a substantial axial extent of the pin.

2. A coupling according to claim 1 wherein said one member comprises a holder and said other member comprises a drilling and countersinking tool.

3. A coupling according to claim 1 wherein said pin is cylindrical.

4. A coupling according to claim 1 wherein said bottom wall of the cam groove is radially spaced a fixed distance from the axis of rotation of the members, said pin intersecting said bore to clear said bottom wall.

References Cited

FOREIGN PATENTS 2,738 1911 Great Britain.

FRANCIS S. HUSAR, Primary Examiner

U.S. Cl. X.R.

287—53, 103